United States Patent [19]

Evans

[11] Patent Number: 5,552,132

[45] Date of Patent: Sep. 3, 1996

[54] PREPARING A CRYSTALLINE ALUMINOPHOSPHATE COMPOSITION

[75] Inventor: Susan T. Evans, Mt. View, Calif.

[73] Assignee: Chevron U.S.A. Inc., San Francisco, Calif.

[21] Appl. No.: 330,401

[22] Filed: Oct. 28, 1994

[51] Int. Cl.⁶ .......................... C01B 37/04; C01B 37/06; C01B 37/08

[52] U.S. Cl. .......................... 423/701; 423/702; 423/713; 423/DIG. 30; 502/208; 502/214

[58] Field of Search ...................... 423/701, 702, 423/713, DIG. 30; 502/62, 208, 214

[56] References Cited

U.S. PATENT DOCUMENTS

| | | | |
|---|---|---|---|
| 4,310,440 | 1/1982 | Wilson et al. | 502/208 |
| 4,320,242 | 3/1982 | Onodera et al. | 585/489 |
| 4,440,871 | 4/1984 | Lok et al. | 502/214 |
| 4,557,917 | 12/1985 | Valyocsik et al. | 423/702 |
| 4,567,029 | 1/1986 | Wilson et al. | 423/306 |
| 4,639,360 | 1/1987 | Valyocsik et al. | 423/706 |
| 4,647,442 | 3/1987 | Derouane et al. | 423/701 |
| 4,713,227 | 12/1987 | Derouane et al. | 423/701 |
| 4,859,311 | 8/1989 | Miller | 208/89 |
| 4,859,314 | 8/1989 | Pellet et al. | 208/114 |
| 4,913,795 | 4/1990 | Valyocsik | 208/46 |
| 4,913,796 | 4/1990 | Valyocsik | 208/46 |
| 4,913,799 | 4/1990 | Gortsema et al. | 208/89 |
| 5,204,076 | 4/1993 | Farnos et al. | 502/62 |
| 5,362,695 | 11/1994 | Beck et al. | 423/702 |

FOREIGN PATENT DOCUMENTS

| | | | |
|---|---|---|---|
| 0055046 | 6/1982 | European Pat. Off. | 423/DIG. 27 |
| 0011818 | 1/1982 | Japan . | |

OTHER PUBLICATIONS

Lok et al "The Role of Organic Molecules in Molecular Sieve Synthesis" *Zeolites* vol. 3 Oct. 1983 pp. 282–291.

*Primary Examiner*—Mark L. Bell
*Assistant Examiner*—David Sample
*Attorney, Agent, or Firm*—A. W. Klaassen; R. J. Sheridan

[57] ABSTRACT

An aluminophosphate-type molecular sieve is prepared using a templating agent derived for an organosulfonium cation of the form $S^+(R)_3$, wherein each R is independently selected from alkyl, aryl and alkylaryl.

33 Claims, No Drawings

PREPARING A CRYSTALLINE ALUMINOPHOSPHATE COMPOSITION

BACKGROUND OF THE INVENTION

1. Field of the Invention

The present invention relates to a aluminophosphate molecular sieve and to its synthesis. More particularly, the present invention relates to the synthesis of a class of aluminophosphate molecular sieves using sulfonium salts as directing agents in the synthesis. The particular class of aluminophosphate molecular sieves to which the present process is directed may also include components such as comprising aluminum, phosphorus, and an optional metal other than aluminum which is incorporated into the crystalline structure.

2. Background of the Invention

Much research effort continues to be expended on discovering new molecular sieves, and on new methods of preparing molecular sieves. In conventional usage the term "molecular sieve" refers to a material having a fixed, open-network structure, usually crystalline, that may be used to separate hydrocarbons or other mixtures by selective occlusion of one or more of the constituents, or may be used as a catalyst in a catalytic conversion process. The term "zeolite" refers to a molecular sieve containing a silicate lattice, usually in association with some aluminum, boron, gallium, iron, and/or titanium. In the following discussion and throughout this disclosure, the terms molecular sieve and zeolite will be used more or less interchangeably. One skilled in the art will recognize that the teachings relating to zeolites are also applicable to the more general class of materials called molecular sieves.

These sieves have been used in a number of important commercial processes. For example, U.S. Pat. No. 4,913,799 discloses the use of non-zeolitic molecular sieves, including metalloaluminophosphates, for hydrocracking processes. U.S. Pat. No. 4,859,314 discusses catalytic cracking processes using similar molecular sieves. U.S. Pat. No. 4,859,311 discloses a dewaxing process using a SAPO-11 type molecular sieve. Considering the benefit which has been derived from the use of known sieves, this work will continue for many years to come.

In the preparation of a molecular sieve, a reaction mixture comprising active sources of the molecular sieve is maintained at crystallization conditions until crystals are formed. Often, the crystallization process is aided by templates or structure directing agents which are included in the reaction/crystallization medium. In the conventional preparation, the templating agent is typically an organic cation which contains nitrogen or phosphorus. Although desirable, and in some cases critical, the use of templating agents for directing the crystallization process may increase the cost and complexity of manufacturing, and may pose a handling and disposal problem after crystallization is complete. Thus, there continues to be a need for new, effective templating agents at reduced manufacturing cost and at reduced environmental and disposal hazard.

An aluminophosphate molecular sieve is any one of a number of crystal structures comprising [AlO$_2$] and [PO$_2$] tetrahedra. Adding an additional metal into the crystalline framework increases the number of possible crystalline forms. As described above, the formation of aluminophosphate molecular sieve crystals may be enhanced by adding to the reaction mixture prior to crystallization an effective amount of a templating agent. For example, U.S. Pat. No. 4,310,440 teaches microporous aluminum phosphate materials with uniform pores and having a chemical composition, expressed in terms of molar ratios of oxides, of Al$_2$O$_3$:1.0±0.2P$_2$O$_5$.

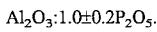

The templating agents taught in U.S. Pat. No. 4,310,440 include organic amines or quaternary ammonium salts.

Silicoaluminophosphates, as taught in U.S. Pat. No. 4,440,871, for example, are microporous, crystalline materials having a three-dimensional crystalline framework of PO$_2^+$, AlO$_2^-$, and SiO$_2$ tetrahedral units. U.S. Pat. No. 4,440,871 teaches preparing silicoaluminophosphates using templating agents disclosed for use in the synthesis of conventional zeolite aluminosilicates and microporous aluminophosphates. The proposed structure directing agents in U.S. Pat. No. 4,440,871 include compounds containing nitrogen, phosphorus, arsenic and antimony.

U.S. Pat. No. 4,567,029 recites crystalline metal-containing aluminophosphates having aluminum, phosphorus and element "M" incorporated into the three-dimensional microporous framework structure, where "M" represents at least one metal selected from magnesium, manganese, zinc and cobalt. Preferred structure directing agents in the '029 reference contain elements of Group VA of the Periodic Table of Elements, particularly nitrogen, phosphorus, arsenic, and antimony. U.S. Pat. No. 4,913,795 and U.S. Pat. No. 4,913,796 teach using C$_5$–C$_7$ alkyldiamines for making metalloaluminophosphates.

Several patents disclose using sulfur-containing templating agents for preparing aluminosilicate zeolites. U.S. Pat. No. 4,557,917 teaches using an anionic template containing a carboxylic acid (preferably a sulfonated succinic acid) moiety for the preparation of ZSM-5. U.S. Pat. No. 4,639,360 teaches using an anionic organosulfonic acid structure directing agent for preparing ZSM-5.

However, none of these patents suggest the use of cationic organosulfonium templating agents for the preparation of aluminophosphate molecular sieves. In particular, the anionic sulfur-containing organic materials identified above as having utility as templating agents in the preparation of molecular sieves have very different chemical action when compared with the organosulfonium structure directing materials of the present invention.

SUMMARY OF THE INVENTION

Accordingly, it is an object of the present invention to provide a method for preparing a molecular sieve using an organosulfonium templating agent.

It is a further object of the invention to provide a method for preparing a molecular sieve with an inexpensive, easily prepared templating agent.

Accordingly, this invention provides for preparing a molecular sieve comprising contacting under crystallization conditions a reaction mixture comprising one or more active sources of said molecular sieve and an organosulfonium cation templating agent capable of forming said molecular sieve.

The invention is also directed to a molecular sieve having a molar composition, as synthesized and in the anhydrous state, as follows:

aQ:(M$_x$Al$_y$P$_z$)O$_2$ wherein:

"Q" is an organosulfonium cation having templating properties;

"a" is the amount of templating agent "Q", and is an effective amount within the range from greater than zero to about 6, preferably from greater than zero to about 3, more preferably from about 0.02 to about 2;

"M" represents at least one element, other than aluminum and phosphorus, which is capable of forming an oxide in tetrahedral coordination with $[AlO_2]$ and $[PO_2]$ oxide structural units in the molecular sieve; and "x", "y", and "z" represent the mole fractions, respectively, of "M", aluminum, and phosphorus, wherein "x" has a value equal to or greater than zero (0), and "y" and "z" each have a value of at least 0.01.

In a preferred embodiment, metallic element "M" is selected from arsenic, beryllium, boron, chromium, cobalt, gallium, germanium, iron, lithium, magnesium, manganese, silicon, titanium, vanadium, nickel, and zinc, more preferably selected from silicon, magnesium, manganese, zinc, and cobalt; and still more preferably is silicon.

Among other factors, the present invention is based on the finding of a new class of templating agents which are effective for directing the crystallization of aluminophosphate molecular sieves. Furthermore, the organosulfonium molecules which are useful as templating agents in the present process are less costly than are conventional templating agents.

DETAILED DESCRIPTION OF THE INVENTION

The present invention is directed towards a new method for preparing molecular sieves using a new class of sulfonium structure-directing agents. A wide variety of molecular sieve materials may be prepared by the present process, which is effective for the crystallization of aluminophosphate molecular sieves in the presence of a structure-directing sulfonium compound.

I. Sulfonium Structure Directing Agents

The organosulfonium cation templating agent is generally derived from a salt containing one or more sulfur-containing organic cations. A preferred organosulfonium salt is of the form $S^+(R)_3 A^-$, wherein each "R" is independently selected from alkyl, aryl and alkylaryl. Preferably, each "R" comprises less than 10 carbon atoms, more preferably from 1 to 6 carbon atoms, when "R" is alkyl and comprises in the range of from 5 to 12 carbon atoms when "R" is otherwise. Each alkyl is a linear, branched or cyclic carbon containing compound. Non-limiting examples include methyl, ethyl, n-propyl, isopropyl, cyclohexyl, alkyl substituted cyclohexyl, cyclopentyl and alkyl substituted cyclopentyl. Non-limiting examples of aryl include phenyl. Each alkylaryl is an alkyl substituted aryl hydrocarbon. The alkyl substituent in alkylaryl has preferably less than 6 and more preferably less than 5 carbon atoms. Non-limiting examples of alkylaryl include methylphenyl, ethylphenyl, n-propylphenyl and isopropylphenyl. A sulfonium compound may have an "R" outside the indicated range by modifying the compound to reduce its physical size or by improving the compound's solubility in the reaction mixture by, for example, increasing the cationic charge of the sulfonium compound or by adding a surfactant to the reaction mixture. Thus, the organosulfonium salts of this invention are preferably at least partially soluble in the reaction mixture and more preferably soluble in aqueous solution. Suitable anions, designated herein as anion $A^-$, are selected so as to not be detrimental to the formation of the molecular sieve. Preferred anions include fluoride, chloride, bromide, iodide, hydroxide, acetate, and tetrafluoroborate.

Sulfonium salts for use in the present invention may be purchased from commercial sources such as ICN (Costa Mesa, Calif.), Aldrich (Milwaukee, Wis.), and Alfa (Ward Hill, Mass.). Sulfonium salts obtained from commercial sources may possess any of a number of anions, such as chloride, iodide, and the like, and may be used "as is" or treated with an anion exchange resin to exchange the anion for a more preferable anion for use in the present invention. One particularly preferred anion for use with the sulfonium salts of the present invention is hydroxide.

Potential advantages of using the hydroxide form of the sulfonium salts include increased solubility in water and increased ease of handling when stored as aqueous solutions. In certain solid salt forms, sulfonium compounds tend to be hygroscopic and can be somewhat difficult to handle. Additionally, when used as hydroxides, the sulfonium containing solution can be used to adjust the pH of the reactive molecular sieve reaction mixture to promote conditions effective for crystallization, rather than requiring the addition of a separate basic component to the reaction mixture.

Another preferred anion for use with the sulfonium compounds of the invention is tetrafluoroborate. Tetrafluoroborate salts often have increased water solubilities when compared to those of the corresponding halide salts.

Sulfonium salts having anions other than hydroxide may be converted to their hydroxide forms by treatment with a hydroxide ion exchange resin such as, for example, Bio-Rad (Hercules, Calif.) AG1-X8 anion exchange resin.

Sulfonium compounds are preferred for use as structure-directing agents in molecular sieve preparations carried out at a pH ranging from about 3.0 to about 8.5. Under extremely basic conditions, sulfonium compounds may be susceptible to decomposition by routes including beta elimination to form the corresponding sulfide or sulfur ylide formation, depending on the structure of the sulfonium "R" groups and the reaction conditions employed (e.g., time, temperature).

Sulfonium salts for use in the present invention may also be formed by a variety of other routes. One preferred route is alkylation of a starting sulfide compound (also referred to as thioether) with one of a number of alkylating agents, such as trimethyloxonium tetrafluoroborate or triethyloxonium tetrafluoroborate. The crude sulfonium salts thus formed are typically purified by recrystallization in a suitable solvent, such as ethanol-ether. One preferred recrystallization solvent composition is 95% ethanol/5% ether.

For compounds for which the starting sulfide materials is not commercially available, the target sulfide intermediates may be prepared by a number of synthetic routes, including alkylation of thiols, sulfur insertion reactions involving cyclization via the ditosylate or dihalide and a metallic sulfide, such as sodium sulfide ($Na_2S$), or electrophilic addition of sulfur dichloride to olefins, followed by reduction to the desired sulfide.

II. Aluminophosphate Molecular Sieve Materials Formed

This invention provides a novel process for preparing a molecular sieve, and a molecular sieve prepared by the novel process. While the skilled practitioner will recognize the usefulness of the present organosulfonium cation templating agent for preparing a wide range of molecular sieves, the discussion which follows will be directed to a particular family of molecular sieves comprising $[AlO_2]$ and $[PO_2]$ units, preferably in a tetrahedral structure. The molecular sieve may optionally comprise $[MO_2]$ oxide units, wherein "M" represents a metal whose oxide may be incorporated into the tetrahedral structural lattice with [AlO$_2$] and [PO$_2$] units.

The aluminophosphate molecular sieves formed in the present process include molecular sieves having a chemical composition, in oxide mole ratios, of AlO$_2$O$_3$:1.0±0.2 P$_2$O$_5$.

Aluminophosphate molecular sieves of this type are described in, for example, U.S. Pat. No. 4,310,440, the disclosure of which is included herein by reference.

In addition, other metals which also form oxides in tetrahedral coordination with [AlO$_2$] and [PO$_2$] units may optionally be incorporated in the framework structures formed. For example, substituted aluminophosphate molecular sieves comprising tetrahedrally-coordinated [AlO$_2$], [PO$_2$], and [SiO$_2$] structural units, for example silicoaluminophosphates, have been disclosed in U.S. Pat. Nos. 4,440,871, 4,943,424, and 5,158,665, the disclosures of which are included herein by reference.

In yet another embodiment, the process of this invention relates to the preparation of substituted aluminophosphate molecular sieves comprising [M$^1$O$_2$], [AlO$_2$], and [PO$_2$] tetrahedrally-bound structural oxide units, where "M$^1$" represents at least one metal selected from magnesium, manganese, zinc, and cobalt. Such substituted aluminophosphates are taught, for example, in U.S. Pat. No. 4,567,029, the disclosure of which is included herein by reference.

In yet another embodiment, the process of this invention relates to the preparation of a substituted aluminophosphate molecular sieve comprising tetrahedrally-bound structural units comprising [M$^2$O$_2$], [AlO$_2$], and [PO$_2$] oxide units, where "M$^2$" represents at least one element selected from arsenic, beryllium, boron, chromium, cobalt, gallium, germanium, iron, lithium, magnesium, manganese, silicon, titanium, vanadium, and zinc. Molecular sieves of this type are taught, for example, in U.S. Pat. No. 4,913,799, the disclosure of which is included herein by reference.

In yet another embodiment, the process of this invention relates to a process for preparing a substituted aluminophosphate molecular sieve comprising tetrahedrally-bound structural units comprising [M$^3$O$_2$], [SiO$_2$], [AlO$_2$], and [PO$_2$] oxide units, where "M$^3$" represents an element capable of forming a three dimensional oxide framework, is characterized by a mean M$^3$—O distance in tetrahedral oxide structures between about 1.51 Angstroms and about 2.06 Angstroms, has a cation electronegativity between about 125 kcal/g-atom and about 310 kcal/g-atom, and is capable of forming stable M$^3$—O—P, M$^3$—O—Al or M$^3$—O—M$^3$ bonds in crystalline three dimensional oxide structures having an "M$^3$—O" bond dissociation energy greater than about 59 kcal/mole at 289° C. Such molecular sieves are taught, for example, in U.S. Pat. No. 4,973,785, the disclosure of which is included herein by reference.

While reference is made herein to the formation of three dimensional crystalline structures using the sulfonium templating agent, one skilled in the art will recognize that layered compounds may also be prepared using one or more of the templating agents.

In preparing a specific aluminophosphate-type molecular sieve, the reaction mixture from which and in which the molecular sieve is crystallized comprises at least one active source of phosphorus, at least one active source of alumina and an organosulfonium cation templating agent capable of preparing the molecular sieve. The reaction mixture may optionally comprise one or more additional templating agents known to provide benefit in the preparation of aluminophosphate-type molecular sieves, including quaternary ammonium salts and/or amines. In addition, the reaction mixture optionally comprises a reactive source of at least one element other than aluminum and phosphorus. More specifically, the reaction mixture has a molar composition of oxides falling within the following ranges:

|  |  | Preferred |
|---|---|---|
| H$_2$O/Al$_2$O$_3$ | 0.5–500 | 1–100 |
| P$_2$O$_5$/Al$_2$O$_3$ | 0.1–1.1 | 0.5–1.0 |
| Q/Al$_2$O$_3$ | 0.1–2.0 | 0.1–1.5 |
| M/Al$_2$O$_3$ | 0–1 | 0–0.7, | wherein "Q" is an organosulfonium templating agent and "M" represents at least one element, other than aluminum and phosphorus, which is capable of forming an oxide in tetrahedral coordination with [AlO$_2$] and [PO$_2$] oxide structural units in the molecular sieve.

Element "M" is preferably selected from arsenic, beryllium, boron, chromium, cobalt, gallium, germanium, iron, lithium, magnesium, manganese, silicon, titanium, vanadium, nickel and zinc. Element "M" is more preferably selected from silicon, magnesium, manganese, zinc and cobalt.

The choice of reactants and reaction conditions determines the structure and composition of the molecular sieve produced. Thus, aluminophosphates are prepared by forming a reaction mixture containing an active source of phosphorus, an active source of alumina, an organosulfonium templating agent, and optionally an active source of at least one element other than phosphorus and aluminum. The reagents are added portionwise and with stirring to form the reaction mixture, and the pH of the mixture is adjusted to within the range of about 3.0 to about 8.5. The resulting reaction mixture, typically in a gel-like state, may optionally be aged prior to hydrothermal treatment. Aging may last from one to several hours. The reaction mixture is then heated in a sealed autoclave at autogenous pressure and a temperature of about 80° C. to about 240° C. for typically 5–5000 hours to crystallize the molecular sieve. The solid reaction product is then recovered by filtration, washed with water, and dried. Drying is typically carried out at room temperature. Reaction mixtures prepared with a low water content, for example having a water/Al$_2$O$_3$ of less than about 8, will require little or no filtration. Organosulfonium templating agents remaining in the molecular sieve can be removed by a number of methods, including washing, dissolution of the directing agent, or by calcining the molecular sieve in air at elevated temperatures, preferably above 650° F.

Active sources of aluminum which may be used include aluminum hydroxide Al(OH)$_3$, gibbsite, boehmite AlO(OH) or pseudo-boehmite, an alumina such as gamma and beta alumina, an alumina salt such as aluminum fluoride, aluminum sulphate, aluminum phosphate or sodium aluminate, or an aluminum alkoxide such as aluminum isopropoxide. Aluminum alkoxide, aluminum hydroxide and pseudo-boehmite are particularly preferred. Phosphoric acid is the preferred source of phosphorus. However, organic phosphates such as triethyl phosphate, and crystalline or microporous aluminophosphates, such as the AlPO$_4$ composition of U.S. Pat. No. 4,310,440 are also satisfactory. Silica sol or fumed silica are preferred sources of silicon. Silica gel and silica hydrogel, silicates, silicic acid, colloidal silica, silica hydroxides, alkoxides of silicon, and reactive solid amorphous precipitated silica are also suitable.

Elements other than phosphorus or aluminum, which are capable of forming an oxide in tetrahedral coordination with [AlO$_2$] and [PO$_2$] oxide structural units in a molecular sieve may be added to the reaction mixture in any form, and preferably as a water soluble salt, which will not be detrimental to the formation of the desired molecular sieve. Typical anions include chloride, fluoride, iodide, nitrate, sulfate, oxalate, and acetate.

In a preferred embodiment, the synthesis method comprises:

a. preparing an aqueous reaction mixture comprising:
  i. at least one active source of alumina selected from $Al(OH)_3$, aluminum isopropoxide and pseudo-boehmite; and
  ii. phosphoric acid; and
b. combining the aqueous reaction mixture with
  i. an organosulfonium cation templating agent; having a molecular structure of the form $S^+(R)_3$, wherein each R is independently selected from alkyl, aryl and alkylaryl; and
  ii. optionally at least one active source of one or more additional elements "M" capable of forming oxides in tetrahedral coordination with $[AlO_2]$ and $[PO_2]$ units, to form the complete reaction mixture; and
c. heating the complete reaction mixture to a temperature in the range of from 80° C. to 240° C. until crystals are formed.

At the start of reaction the pH of the reaction mixture may be adjusted as required for the synthesis of the desired aluminophosphate molecular sieve. As an example, the reaction mixture from which silicoaluminophosphates, containing silica, alumina and phosphorus in the crystalline structure, are prepared will typically have a pH in the range of about 3.0 to about 8.5, and preferably in the range of about 3.0 to about 6.0.

One or more of the active sources of oxides which are incorporated into the crystalline aluminophosphate structure may be only partially soluble in the aqueous reaction mixture from which the crystals are formed. Methods for reducing the particle size of these active sources prior to crystallization is fully described in U.S. Pat. No. 5,158,665, the entire disclosure of which is incorporated herein by reference.

The crystallization of the molecular sieve is typically conducted at hydrothermal conditions under pressure, usually in an autoclave so that the reaction mixture is subject to autogenous pressure. The crystallization reactions may be carried out under static conditions, or optionally with stirring. Following crystallization, the reaction mixture containing the molecular sieve is filtered and the recovered crystals are washed, for example, with water, and then dried at room temperature or, for example, by heating at from 25° C. to 150° C. at atmospheric pressure. Typically, the supernatant liquid above the crystals is removed prior to the initial filtering of the crystals.

The molecular sieve prepared by the present method is beneficially subjected to thermal treatment to remove the organic templating agent from within the pore structure. This thermal treatment is generally performed by heating at a temperature of 300° C. to 600° C. for at least 1 hour and generally not longer than 20 hours. While subatmospheric pressure can be employed for the thermal treatment, atmospheric pressure is desired for reasons of convenience. The thermally treated product is particularly useful in the catalysis of certain hydrocarbon conversion reactions.

The molecular sieves prepared using the method of this invention have different crystalline forms depending on starting materials and reaction conditions. Factors which may affect the composition and/or structure of the crystalline form of aluminophosphates include the specific organosulfonium templating agent used, the metal oxide/alumina mole ratio, reaction temperature and time, and presence of optional metal oxide additives.

There are a number of methods in accordance with this invention whereby the pH can be controlled to the desired level. When used alone as templating agents, organosulfonium compounds can be used in their hydroxide form. Optionally, the reaction solution can be made alkaline by addition of other components, for example, alkali metal oxides, organic amines such as dipropyl amine and quaternary ammonium salts. The use of organic amines and quaternary ammonium salts as templating agents for making aluminophosphates is known. However, in another aspect of the present process, by combining organosulfonium compounds with organic amines or quaternary ammonium salts, both the sulfonium salt and the amine work in concert as combination templating agents. Production of some crystal structures of this invention appear to be enhanced by the use of mixed templating agents comprising organosulfonium salts and an organic amine or quaternary ammonium salt.

Typical examples of aluminophosphate molecular sieves which can be prepared according to this invention include AlPO-5, AlPO-31, AlPO-41, SAPO-5, SAPO-11, SAPO-41, MAPO-5, MAPO-11, MAPO-14, MAPO-34, CoAPO-14, and other similar materials. New molecular sieve structures may result as well by the present method. As used herein, "MAPO" represents a molecular sieve containing magnesium, aluminum and phosphorus. "CoAPO" represents a molecular sieve cobalt, aluminum and phosphorus. "SAPO" represents silicon aluminum phosphate or silicoaluminophosphate. The indices (e.g. "-5") represent a particular crystalline structure, and the naming practice used here is conventional.

Several aluminophosphates, including MAPO-5, MAPO-11, and MAPO-20, which are not easily formed in the absence of organic templating agents, are made at high purity when prepared in the presence of organosulfonium templating agents.

AlPO-5, AlPO-31, and AlPO-41 are described in U.S. Pat. No. 4,310,440. The descriptions of the molecular sieves, and of the preparations thereof, are incorporated herein by reference. AlPO-5, AlPO-31, and AlPO-41 can be suitably prepared by mixing sources of silica and phosphorus with an organosulfonium templating agent, Q, to prepare a reaction mixture having the following composition, in terms of mole ratios of oxides:

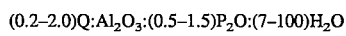

$(0.2–2.0)Q:Al_2O_3:(0.5–1.5)P_2O:(7–100)H_2O$

The reaction mixture is heated at autogenous conditions and at a temperature of at least 100° C., preferably between 100° C. and 200° C. until crystallization, usually a period from 2 hours to about 10 days. Following crystallization and calcination, the preferred chemical composition of the AlPO-5, AlPO-31, or AlPO-41 aluminophosphate molecular sieve as described above, in oxide mole ratios, is:

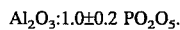

$Al_2O_3:1.0\pm0.2\ PO_2O_5$.

SAPO-5, SAPO-11, and SAPO-41 are described in, for example, U.S. Pat. No. 4,440,871. The descriptions of the molecular sieves, and of the preparations thereof, are incorporated herein by reference. In the preferred synthesis procedure for SAPO molecular sieves, a reaction mixture is prepared having a composition expressed in terms of molar oxide ratios as follows:

$aQ:(Si_xAl_yP_z)O_2:cH_2O$ wherein "Q" is an organosulfonium templating agent; "a" has a value great enough to constitute an effective concentration of "Q" and is within the range of greater than 0 to 3; "c" has a value of from zero to 500, preferably 2 to 30; "x", "y" and "z" represent the mole fractions, respectively, of silicon, aluminum and phosphorus in the $(Si_xAl_yP_z)O_2$ constituent, and each has a value of at least 0.01, said reaction mixture having been formed by combining at least a portion of each of the aluminum and phosphorus sources in the substantial absence of the silicon source and thereafter combining the resulting mixture with the remaining constituents to form the complete reaction mixture.

SM-3, and the conventional preparation thereof, are disclosed in, for example, U.S. Pat. Nos. 5,208,005 and 5,158,665, the disclosures of which are incorporated herein by reference. The method for preparing SM-3 according to the instant process comprises:

(a) preparing an aqueous reaction mixture containing a reactive source of $SiO_2$, aluminum isopropoxide, phosphoric acid, and an organosulfonium organic templating agent, said reaction mixture having a composition expressed in terms of mole ratios of oxides as follows:

$$aQ:Al_2O_3:(0.9-1.2)P_2O_5:(0.1-4.0)SiO_2:cH_2O$$

wherein "Q" is an organosulfonium templating agent; "a" has a value large enough to constitute an effective amount of Q and preferably has a value such that there are from 0.20 to 2 moles of Q per mole of aluminum oxide; "c" has a value such that there are 0.5 to 40 moles of $H_2O$ mole of aluminum oxide; said reaction mixture having been formed by combining the alumina and phosphorus sources in the substantial absence of the silicon source and thereafter combining the resulting mixture with the silicon source and the organic templating agent to form the complete reaction mixture;

(b) adjusting the pH of the reaction mixture from about 3.0 to 8.5;

(c) heating the reaction mixture to a temperature in the range of from 150° C. to 240° C. until crystals of silicoaluminophosphate are formed; and (d) recovering said crystals.

MAPO-5, MAPO-11, MAPO-14, MAPO-are described in U.S. Pat. No. 4,567,029. The descriptions of the molecular sieves, and of the preparations thereof, are also incorporated by reference. In the preferred synthesis procedure for MAPO-5, MAPO-11, MAPO-14, MAPO-34 and CoAPO-14 molecular sieves, a reaction mixture is prepared having a composition expressed in terms of molar oxide ratios as follows:

$$aQ:(M_xAl_yP_z)O_2:cH_2O$$

wherein "Q" is an organosulfonium templating agent; "a" has a value great enough to constitute an effective concentration of "Q" and is within the range of greater than 0 to 6; "c" has a value of zero to 500, preferably 0.5 to 30; "M" represents magnesium or cobalt; "x", "y" and "z" represent the mole fractions, respectively, of "M", aluminum and phosphorus in the $(M_xAl_yP_z)O_2$ constituent, and each has a value of at least 0.01.

The molecular sieve recovered from the crystallization step can be used as synthesized, can be dried or can be thermally treated (calcined). Typical calcining conditions include heating in air or inert gas at temperatures ranging from about 200° C. to 820° C. for periods of time ranging from 1 to 48 hours, or more to produce a catalytically active product especially useful in hydrocarbon conversion processes. The molecular sieve can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Group VIII metals such as platinum and palladium are preferred. The amount of metal ranges from about 0.01% to about 10% by weight of the molecular sieve, preferably from about 0.2 to about 5% by weight of the molecular sieve.

Hydrogen, ammonium, and the metal components can be exchanged into the molecular sieve. The molecular sieve can also be impregnated with the metals, or the metals can be physically intimately admixed with the molecular sieve using standard methods known to the art. Alternatively, the metals can be occluded in the crystal lattice by having the desired metals present as ions in the reaction mixture from which the molecular sieve is prepared.

The techniques of introducing catalytically active metals to a molecular sieve are disclosed in the literature, and pre-existing metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960, 3,373,109, 4,202,996; 4,440,781 and 4,710,485, which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

The molecular sieve may be used as a catalyst without additional forming. Alternatively, the molecular sieve can be composited with other materials resistant to the temperatures and other conditions employed in organic conversion processes, using techniques such as spray drying, extrusion, and the like. Such matrix materials include active and inactive materials and synthetic or naturally occurring zeolites as well as inorganic materials such as alumina, clays, silica and metal oxides. The latter may occur naturally or may be in the form of gelatinous precipitates, sols, or gels, including mixtures of silica and metal oxides. Use of an active material in conjunction with the synthetic molecular sieve, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, molecular sieve materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the molecular sieve include the montmorillonite and kaolin families which include the subbentonites, and the kaolins commonly known as Dixie, McNamee, Georgia, and Florida clays or others in which the main mineral constituent is halloysite, kaolinite, dickite, nacite, or an auxite. Such clays can be used in the raw state as originally mined or initially subjected to calcination, acid treatment, or chemical modification. Binders useful for compositing with the present crystal also include inorganic oxides, notably alumina or silica.

In addition to the foregoing materials, the molecular sieve produced can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia. The relative proportions of finely divided molecular sieve material and inorganic oxide gel matrix vary widely, with the crystal content ranging from 1 to 90% by weight and more usually, particularly when the composite is prepared in the form of beads, in the range of 2 to 80 weight percent of the composite.

Molecular sieves prepared in the present process are useful for a variety of organic, e.g., hydrocarbon, conversion processes. Hydrocarbon conversion reactions are chemical and catalytic processes in which carbon containing compounds are changed to different carbon containing compounds. Examples of hydrocarbon conversion reactions include catalytic cracking, hydrocracking, dewaxing, and olefin and aromatics formation reactions, including formation from oxygenates. The catalysts are useful in other petroleum refining and hydrocarbon conversion reactions such as isomerizing and hydroisomerizing paraffins and olefins, polymerizing and oligomerizing olefinic or acetylinic compounds such as isobutylene and pentene-1, reforming, alkylating, isomerizing polyalkyl substituted aromatics (e.g. meta xylene), and disproportionating aromatics (e.g. toluene) to provide mixture of benzene, xylenes and higher methylbenzenes.

Not all templating agents suitably employed in the preparation of certain species of aluminophosphates of this invention are suitable for the preparation of all members of the generic class. The relationship of specific templating agents to the individual product species is apparent from the illustrative Examples set forth herein.

EXAMPLES

I. Preparation of Sulfonium Directing Agents
Template A:

Triethylsulfonium hydroxide—$(CH_3CH_2)_3S^+OH^-$

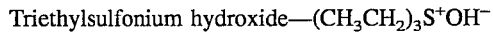

An aqueous suspension of triethylsulfonium iodide (Alfa) was stirred over a 1.5 to 2 milliequivalent excess of Bio-Rad AG1-X8 anion exchange resin for 1 day at room temperature. The product, triethylsulfonium hydroxide, was confirmed by acid/base titration.

Aqueous hydroxide exchanged solutions of triethylsulfonium, trimethylsulfonium, triphenylsulfonium and methyldipropylsulfonium compounds stored at 5° C. (~0.40–0.70M solutions) showed little or no decomposition over a six-week period, as determined by comparative titrations over time.
Template B:

Methyldipropylsulfonium hydroxide—$(CH_3CH_2CH_2)_2S^{30}(CH_3)OH^-$

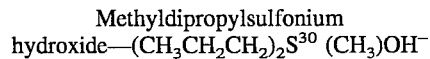

In a 250 ml round bottom flask, 5.13 g dipropylsulfide (Aldrich) was dissolved in 100 ml $CH_3NO_2$. A solution of 7.62 grams $(CH_3)_3OBF_4$ in 50 ml $CH_3NO_2$ was added dropwise to the reaction flask in an ice bath. The mixture was stirred at room temperature for 2 days. The solvent was then removed by rotary evaporation, and ml $CH_2Cl_2$ added to the resulting colorless oil. Upon addition of ethyl ether (20–25 ml) to the oil, crystals formed. The crystals were dried under vacuum in a hot water bath.

9.6 grams of the crystals were dissolved in 42.1 grams deionized water. 42.1 grams of Bio-Rad AG1-X8 anion exchange resin were added and the mixture stirred at room temperature for over 24 hours. The mixture containing the ion exchange resin was then filtered, and the resin washed with 14.03 grams water. The solution was titrated with 0.1N HCl to indicate the extent of exchange to methyldipropylsulfonium hydroxide.
Template C:

Methyldiisopropylsulfonium hydroxide—$[(CH_3)_2CH]_2S^+(CH_3)OH^-$

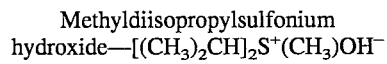

To a suspension of 40 grams of $Me_3O^+BF_4^-$ in 250 ml anhydrous $CH_2Cl_2$ was added dropwise grams of diisopropyl sulfide dissolved in 200 ml anhydrous $CH_2Cl_2$. The resulting solution was stirred overnight and filtered to remove unreacted oxonium salt. The filtrate was concentrated under vacuum and triturated with ethyl acetate to remove any impurities. The resulting solid was identified as methyldiisopropylsulfonium tetrafluoroborate using $^1H$ NMR, $^{13}C$ NMR, thin layer chromatography and carbon/hydrogen/sulfur analysis.

The tetrafluoroborate was converted to the hydroxide by stirring overnight at room temperature a solution of 9.6 g of the tetrafluoroborate in 42.1 g deionized water with 42.1 g Bio-Rad AG1-X8 anion exchange resin. The product was confirmed using acid/base titration.
Template D:

Diethylphenylsulfonium hydroxide—$(CH_3CH_2)_2S^+(C_6H_5)OH^-$

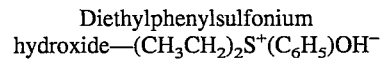

Triethyloxonium tetrafluoroborate (54 ml of a 1M solution in $CH_2Cl_2$) was added dropwise to a solution of 5.09 g ethylphenyl sulfide dissolved in 40 ml anhydrous $CH_2Cl_2$. The solution was stirred for about 48 hours at room temperature. The sulfonium salt product was precipitated out of solution by addition of diethyl ether. The crude product was filtered, dried en vacuo and recrystallized from 95% ethyl alcohol/diethyl ether. The product was identified using thin layer chromatography, $^1H$ NMR, and carbon/hydrogen/sulfur analysis.

The tetrafluoroborate was converted to the hydroxide using the procedure of Template C above.
Template E:

Ethyldiisopropylsulfonium hydroxide—$[(CH_3)_2CH]_2S^+(CH_3CH_2)OH^-$

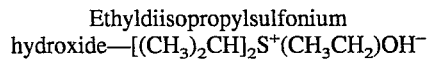

Triethyloxonium tetrafluoroborate (63 ml of a 1M solution in $CH_2Cl_2$) was added dropwise to a solution of 5.02 g diisopropyl sulfide dissolved in 40 ml anhydrous $CH_2Cl_2$. The solution was stirred for about 48 hours at room temperature. The sulfonium salt product was precipitated out of solution by addition of diethyl ether. The crude product was filtered and dried en vacuo and recrystallized from 95% ethyl alcohol/diethyl ether. The product was identified using thin layer chromatography, $^1H$ NMR, and carbon/hydrogen/sulfur analysis.

The tetrafluoroborate was converted to the hydroxide using the procedure of Template C above.
Template F:

Trimethylsulfonium hydroxide—$(CH_3)_3S^+OH^-$

An aqueous solution of trimethylsulfonium iodide (Aldrich) was stirred over a 1.5 to 2 milliequivalent excess of Bio-Rad AG1-X8 anion exchange resin for 1 day at room temperature. The product, trimethylsulfonium hydroxide, was confirmed by acid/base titration.
Template G:

Triphenylsulfonium hydroxide—$(C_6H_5)_3S^+OH^-$

A 50% aqueous solution of triphenylsulfonium chloride (ICN) was hydroxide-exchanged using the procedure of Template F.
The product, triphenylsulfonium hydroxide, was confirmed by acid/base titration.
Template H:

Diphenylethylsulfonium
Hydroxide—$(C_6H_5)_2S^+(CH_3CH_2)OH^-$

Triethylsulfonium tetrafluoroborate (40 ml of a 1M solution in $CH_2Cl_2$) was added dropwise to a solution of 5.36 g diphenyl sulfide dissolved in 25 ml anhydrous $CH_2Cl_2$. The solution was stirred for about 48 hours at room temperature. The sulfonium salt product was precipitated out of solution by addition of diethyl ether. The crude product was filtered and dried en vacuo and recrystallized from 95% ethyl alcohol/diethyl ether. The product was identified using thin layer chromatography, $^1H$ NMR, and carbon/hydrogen/sulfur analysis.
The tetrafluoroborate was converted to the hydroxide using the procedure of Template C above.
II. Preparation of Molecular Sieves Example 1A Preparation of MAPO-5
A reaction mixture was prepared by combining 1.645 grams 85% orthophosphoric acid ($H_3PO_4$), 2.0 grams deionized water, and 0.307 grams magnesium acetate tetrahydrate $(Mg(CH_3CO_2)_2 \cdot 4H_2O)$, to which was added Catapal B alumina (a commercially available hydrated pseudo-boehmite aluminum oxide with a composition of 74.2 wt % $Al_2O_3$ and 25.8 wt % $H_2O$ and identified as Vista Catapal Alumina 10343 SB, purchased from Harshaw) and stirred until homogeneous. To this mixture was added 11.8 ml of a 0.59 molar aqueous solution of triethylsulfonium hydroxide (Template A), and the mixture stirred until homogeneous. The composition of the final reaction mixture in molar oxide ratios was:

0.45(Template A):$Al_2O_3$:0.9$P_2O_5$:0.09MgO:55$H_2O$.

The pH of the final reaction mixture prior to heating was 3.62. The reaction mixture was sealed in a stainless steel pressure vessel lined with polytetrafluoroethylene and heated in an oven at 150° C. at autogeneous pressure without stirring for 41 hours. The final pH was 3.11. The solid reaction product was recovered by filtration, washed with water, and dried in air at room temperature. The major phase in the product had the X-ray powder diffraction pattern of MAPO-5.
$^{13}C$ MAS (magic angle spinning) NMR of the recovered product revealed the intact organosulfonium cation: δ32.5(1C), δ8.53 (1C). Chemical analysis of the recovered solid revealed the following weight percents:

17.11 Al:22.10 P:1.86 Mg:2.39 S.

The corresponding calculated molar ratios are as follows:

0.9 Al:1.0 P:0.11 Mg:0.10 S.

Example 1B

Preparation of MAPO-5
Example 1A was repeated, with the exception that the reaction mixture was tumbled (stirred) at 30 rpm during heating at 150° C. at autogeneous pressure for 41 hours. The major phase identified in the crystalline product was again MAPO-5.

Example 2A

Preparation of MAPO-5
A reaction mixture was prepared by combining 8.62 grams of 85% orthophosphoric acid ($H_3PO_4$) and grams of deionized water, to which was added 4.8 grams hydrated alumina oxide (Catapal B) and 3 ml of water. To this mixture was added 1.57 grams of magnesium acetate tetrahydrate $(Mg(CH_3CO_2)_2 \cdot 4H_2O)$ and approximately 1 gram water. This gel mixture was stirred for one hour.
A template solution was prepared by mixing 0.775 grams deionized water with 0.225 grams of methyldiisopropylsulfonium hydroxide (Template C).
1.82 grams of the gel mixture were combined with 2.17 grams of template solution to give a calculated methyldiisopropylsulfonium hydroxide/phosphorus molar ratio of 0.55. The reaction mixture was placed in a sealed stainless steel pressure vessel and heated in an oven at 135° C. at autogenous pressure with no stirring for 30.5 hours. The solids were recovered by filtration, washed with water, and dried in air at room temperature. The solids were found by X-ray diffraction to be MAPO-5 with minor amounts of MAPO-34 impurity.

Example 2B

Preparation of MAPO-5
Example 2A was carried out as described in Example 2A, with the exception that the reaction mixture was heated at 150° C. without stirring for 40 hours. The solids recovered from the heating step were found by XRD to be MAPO-5 with lesser amounts of MAPO-11.

Example 3

Preparation of MAPO-11
A reaction mixture was prepared by combining 85% orthophosphoric acid ($H_3PO_4$) and deionized water, to which was added hydrated alumina oxide (Catapal B). A solution prepared by dissolving magnesium acetate tetrahydrate $(Mg(CH_3CO_2)_2 \cdot 4H_2O)$ in $H_2O$ was added to this mixture and the resulting mixture combined with trimethylsulfonium hydroxide (Template F) dissolved in deionized water to form the final reaction mixture having a composition in terms of molar oxide ratios of:

1(Template F):0.9Al2O3:1.0P2O5:0.1MgO:104H2O

The reaction mixture was placed in a sealed stainless steel pressure vessel and heated in an oven at 150° C. at autogenous pressure with no stirring for 40 hours. The solids were recovered by filtration, washed with water, and dried in air at room temperature. The solids were found by X-ray diffraction to be MAPO-11 containing trace unidentified impurities.

Example 4

Preparation of MAPO-14

A reaction mixture was prepared by combining 14.0 grams of 85% orthophosphoric acid ($H_3PO_4$) and 14.0 grams of deionized water, to which was added 2.12 grams hydrated alumina oxide (Catapal B) and 0.75 grams of magnesium acetate tetrahydrate ($Mg(CH_3CO_2)_2 \cdot 4H_2O$) and approximately 1 gram water. This gel mixture was stirred for one hour.

A template solution was prepared by mixing 0.775 grams deionized water with 0.225 grams of trimethylsulfonium hydroxide (Template F).

Sufficient templating solution was added to the gel mixture to give a calculated trimethylsulfonium hydroxide/phosphorus molar ratio of 1.0. The reaction mixture was placed in a sealed stainless steel pressure vessel and heated in an oven at 135° C. at autogenous pressure with no stirring for 2.5 days. The solids were recovered by filtration, washed with water, and dried in air at room temperature. The solids were found by X-ray diffraction to be MAPO-14.

Example 5

Preparation of MAPO-34

Example 2 was repeated, except that the reaction mixture was placed in a sealed stainless steel pressure vessel and heated in an oven at 170° C. at autogenous pressure with no stirring for 30.5 hours. The recovered solids were found by X-ray diffraction to be MAPO-34, with lesser amounts of MAPO-5.

Example 6

Preparation of SAPO-5

A reaction mixture was prepared by combining 1.315 grams of 85% orthophosphoric acid ($H_3PO_4$) and 1.5 grams of deionized water. 0.597 grams of tetraethylorthosilicate (Baker) were then added dropwise and the mixture stirred for 1 hour. Catapal B was then added over a 1.5 hour period. To this mixture was added dropwise with stirring a 0.6M solution of triethylsulfonium hydroxide (Template A) for a total of 11.6 grams template. The gel mixture was than aged at room temperature for 2 hours.

The gel mixture was then placed in a sealed stainless steel pressure vessel and heated in an oven at 150° C. at autogenous pressure with no stirring for 2.5 days. The solids were recovered by filtration, washed with water, and dried in air at room temperature. The solids were found by X-ray diffraction to be primarily SAPO-5.

Example 7

Preparation of SAPO-11

A gel mixture was prepared by combining 1 gram deionized water with 1.059 grams of 85% orthophosphoric acid ($H_3PO_4$) and then adding 0.0094 grams Catapal B alumina over 2.5 hours with stirring. To this mixture was added 0.00188 grams Cabosil M-5 silica gel over 15–20 minutes with stirring.

A 2.85 gram aliquot of the gel mixture was then placed in a teflon reactor, and 10.2 ml of a 0.46 molar aqueous solution of methyldipropylsulfonium hydroxide (Template B) added. The reactor was then heated for 2.5 days at 150° C. without stirring. The solids were recovered by filtration, washed with water, and dried in air at room temperature. The solids were found by X-ray diffraction to be primarily SAPO-11, with minor amounts of SAPO-5 and possible SAPO-33.

Example 8

Preparation of SAPO-41

A gel mixture was prepared by combining 1 gram deionized water with 1.059 grams of 85% orthophosphoric acid ($H_3PO_4$) and then adding 0.0094 grams Catapal B alumina over 2.5 hours with stirring. To this mixture was added 0.00188 grams Cabosil M-5 silica gel over 15–20 minutes with stirring.

A 2.85 gram aliquot of the gel mixture was then placed in a teflon reactor, and 7.0 ml of a 0.67 molar aqueous solution of trimethylsulfonium hydroxide (Template F) added. The pH of the mixture was 3.9. The reactor was then heated for 2.5 days at 150° C. without stirring. The solids were recovered by filtration, washed with water, and dried in air at room temperature. The solids were found by X-ray diffraction to be primarily SAPO-41, with a minor amount of an unidentified contaminant.

Example 9

Preparation of ALPO-5

A gel mixture was prepared by stirring together 10.35 grams of 85% orthophosphoric acid ($H_3PO_4$), 6.05 grams Pural SB alumina (Condea) and 36 grams deionized water. 2.9 grams of this gel mixture was aged overnight at room temperature and pressure. 3.23 grams of a 1.15M aqueous methyldiisopropylsulfonium hydroxide (Template C) solution were added dropwise with stirring. The resultant solution, having a pH of 6.41, was aged for 2 hours at room temperature and for a further hours at 135° C. The resulting product was removed and filtered, and the solid was found by XRD to be ALPO-5.

Example 10

Preparation of ALPO-5

A gel mixture was prepared by stirring together 10.35 grams of 85% orthophosphoric acid ($H_3PO_4$), 6.05 grams Pural SB alumina (Condea) and 36 grams deionized water. 2.9 grams of this gel mixture was aged =overnight at room temperature and pressure. 4.34 grams of a 1.15M aqueous methyldiisopropylsulfonium hydroxide (Template C) solution were added dropwise with stirring. The resultant solution, having a pH of 7.02, was aged for 2 hours at room temperature and for a further 20 hours at 150° C. The resulting product was removed and filtered, and the solid was found by XRD to be ALPO-5.

Example 11

Preparation of ALPO-5

A gel mixture was prepared by stirring together 10.88 grams of 85% orthophosphoric acid ($H_3PO_4$), 6.42 grams Catapal B, and 6 grams deionized water, with the Catapal being added over a period of 1 hour. The gel mixture was divided into 12 equal portions. To one of the portions was added 5.3 ml of a 0.756 molar aqueous solution of diethylphenylsulfonium hydroxide (Template D) dropwise with stirring. The resultant solution, having a pH of 4.00, was aged for 2 hours at room temperature and for a further 15 hours at 150° C. The resulting product was removed and filtered, and the solid was found by XRD to be ALPO-5.

Example 12

Preparation of ALPO-5

A gel mixture was prepared by stirring together 10.88 grams of 85% orthophosphoric acid ($H_3PO_4$), 6.42 grams Catapal B, and 6 grams deionized water, with the Catapal being added over a period of 1 hour. The gel mixture was divided into 12 equal portions. To one of the portions was added 5.9 ml of a 0.676 molar aqueous solution of ethyldiisopropylsulfonium hydroxide (Template E) dropwise with stirring. The resultant solution, having a pH of 3.29, was aged for 2 hours at room temperature and for a further 15 hours at 150° C. The resulting product was removed and filtered, and the solid was found by XRD to be ALPO-5.

Example 13

Preparation of ALPO-31

A gel mixture was prepared by vigorously stirring 31.185 grams Catapal B alumina to a mixture of 42.75 grams of 85% orthophosphoric acid ($H_3PO_4$) and 80.46 grams deionized water over a 1.25 hour period.

A templating solution was prepared by dissolving 35.64 grams trimethyl sulfonium iodide (Aldrich) in 54.0 grams deionized water.

The templating solution was added to the gel mixture and the mixture stirred for 2 hours. 17.69 grams of dipropylamine (Aldrich) was then added to the gel mixture with stirring, and the stirring was continued overnight at ambient conditions.

This mixture was allowed to age at room temperature and pressure for 7 days. The reaction mixture was then sealed in a stainless steel pressure vessel lined with polytetrafluoroethylene and heated in an oven at 150° C. at autogeneous pressure for 28 hours. The resulting product was removed and filtered, and the solid was found by XRD to be essentially pure AlPO-31.

Example 14

Preparation of AlPO-41

A gel mixture was prepared by vigorously stirring 31.185 grams Catapal B alumina to a mixture of 42.75 grams of 85% orthophosphoric acid ($H_3PO_4$) and 80.46 grams deionized water over a 1.25 hour period.

11.5 grams of the gel mixture were combined with 1.18 grams of dipropylamine and with 2.38 grams trimethylsulfonium iodide (Aldrich) which had been dissolved in 3.60 grams water. The combined mixture was aged in a stainless steel pressure vessel lined with polytetrafluoroethylene for 16 days at ambient conditions, and then heated at 150° C. and autogeneous pressure for hours. The recovered solid product was largely AlPO-41 with minor amounts of AlPO-11 impurity.

Example 15

Preparation of CoAPO-14

A gel mixture was prepared by combining grams deionized water with 8.63 grams of 85% orthophosphoric acid ($H_3PO_4$) and then adding 4.54 grams Catapal B alumina over 1 hours with vigorous stirring. To this mixture was added dropwise with continued stirring an aqueous solution of 1.49 grams $Co(OAc)_2 \cdot 4H_2O$ dissolved in 7 grams deionized water.

A 3.0 gram aliquot of the gel mixture was then placed in a teflon reactor, and 6.49 grams of 0.0147 molar aqueous trimethylsulfonium hydroxide (Template F) were added dropwise with stirring over a 1 hour period. The pH of the mixture was 6.52. The reaction mixture was aged for 1 hour at ambient conditions and then heated for 8 days at 135° C. The solids were recovered by filtration, washed with water, and dried in air at room temperature. The solids were found by X-ray diffraction to be primarily CoAPO-14.

Example 16

Calcination of MAPO-5.

MAPO-5, prepared by the method of Example 2, was heated to 1000° F. in air. It was found that 9.9 wt % of the MAPO-5, as prepared, was lost during calcination. This weight loss was consistent with the amount of organosulfonium templating agent present in the MAPO-5. The XRD pattern of the calcined material was consistent with the XRD pattern of the AFI crystal structure.

What is claimed is:

1. A method for preparing a molecular sieve comprising [$AlO_2$] and [$PO_2$] units in tetrahedral coordination, said method comprising contacting under crystallization conditions a reaction mixture comprising at least one active source of phosphorous, at least one active source of alumina, and an organosulfonium cation templating agent capable of forming said molecular sieve, wherein the organosulfonium cation has a molecular structure of the form $S^+(R)_3$, wherein each "R" is independently selected from alkyl, aryl and alkyaryl.

2. The method according to claim 1 wherein each "R" comprises less than 10 carbon atoms when "R" is alkyl and comprises in the range of from 5 to 12 carbon atoms when "R" is otherwise.

3. The method according to claim 2 wherein each "R" is independently selected from methyl, ethyl, n-propyl, isopropyl and phenyl.

4. The method according to claim 3 wherein the organosulfonium cation templating agent is one or more of triethylsulfonium cation, methyldipropylsulfonium cation, methyldiisopropylsulfonium cation, diethylphenylsulfonium cation, ethyldiisopropylsulfonium cation, trimethylsulfonium cation, triphenylsulfonium cation, diphenylethylsulfonium cation.

5. The method according to claim 1 wherein the organosulfonium cation templating agent is derived from a salt of the form $S^+(R)_3A^-$, wherein $A^-$ is an anion which is not detrimental to the formation of the molecular sieve.

6. The method according to claim 5 wherein anion $A^-$ is selected from fluoride, chloride, bromide, iodide, hydroxide, acetate, and tetrafluoroborate.

7. The method according to claim 5 wherein anion $A^-$ is hydroxide.

8. The method according to claim 1 wherein the at least one active source of alumina is selected from $Al(OH)_3$, aluminum isopropoxide and pseudo-boehmite.

9. The method according to claim 1 wherein the at least one active source of phosphorus is phosphoric acid.

10. The method according to claim 1 wherein the reaction mixture has a molar composition of oxides falling within the following ranges:

| | |
|---|---|
| $H_2O/Al_2O_3$ | 0.5–500 |
| $P_2O_5/Al_2O_3$ | 0.1–1.1 |
| $Q/Al_2O_3$ | 0.1–2.0 |
| $M/Al_2O_3$ | 0–1 | wherein "Q" is the organosulfonium cation templating agent and "M" represents at least one element, other than aluminum and phosphorus, which is capable of forming an oxide in tetrahedral coordination with [AlO$_2$] and [PO$_2$] oxide structural units in the molecular sieve.

11. The method according to claim 10 wherein element "M" is selected from silicon, magnesium, manganese, zinc and cobalt.

12. The method according to claim 1 wherein the reaction mixture comprises an active source of an element selected from silicon, magnesium, manganese, zinc and cobalt.

13. The method according to claim 1 wherein the molecular sieve has a molar composition, as synthesized and in the anhydrous state, as follows:

$$aQ:(M_xAl_yP_z)O_2$$

wherein:

"Q" is the organosulfonium cation templating agent;

"a" has a value great enough to constitute an effective concentration of "Q" and is within the range of from greater than zero (0) to no greater than about 6;

"M" represents at least one element, other than aluminum and phosphorus, which is capable of forming an oxide in tetrahedral coordination with [AlO$_2$] and [PO$_2$] oxide structural units in the molecular sieve;

"x", "y", and "z" represent the mole fractions, respectively, of "M", aluminum, and phosphorus, wherein "x" has a value equal to or greater than zero (0), and "y" and "z" each have a value of at least 0.01.

14. The method according to claim 13 wherein element "M" is selected from silicon, magnesium, manganese, zinc and cobalt.

15. The method according to claim 1 wherein the molecular sieve is AlPO-5, AlPO-31, AlPO-41, SAPO-5, SAPO-11, SAPO-41, MAPO-5, MAPO-11, MAPO-14, MAPO-34 or CoAPO-14.

16. The method according to claim 15 wherein the molecular sieve is AlPO-5, AlPO-31, AlPO-41, SAPO-5, SAPO-11, or SAPO-41.

17. A method for preparing a molecular sieve comprising:
a. preparing an aqueous reaction mixture comprising:
  i. at least one active source of alumina; and
  ii. at least one active source of phosphorus; and
b. combining the aqueous reaction mixture with
  i. an organosulfonium cation templating agent capable of forming said molecular sieve, wherein the organosulfonium cation having a molecular structure of the form S$^+$(R)$_3$, wherein each "R" is independently selected from alkyl, aryl and alkyaryl; and
  ii. optionally at least one active source of one or more additional elements "M" capable of forming oxides in tetrahedral coordination with [AlO$_2$] and [PO$_2$] units, to form a complete reaction mixture; and
c. heating the complete reaction mixture at a temperature in the range of from about 80° C. to about 240° C. until crystals are formed.

18. The method according to claim 17 wherein each "R" comprises less than 10 carbon atoms when "R" is alkyl and comprises in the range of from 5 to 12 carbon atoms when "R" is otherwise.

19. The method according to claim 17 wherein the organosulfonium cation templating agent is one or more of triethylsulfonium cation, methyldipropylsulfonium cation, methyldiisopropylsulfonium cation, diethylphenylsulfonium cation, ethyldiisopropylsulfonium cation, trimethylsulfonium cation, triphenylsulfonium cation, diphenylethylsulfonium cation.

20. The method according to claim 17 wherein the organosulfonium cation templating agent is added to the reaction mixture in the form S$^+$(R)$_3$A$^-$, wherein A$^-$ is an anion which is not detrimental to the formation of the molecular sieve.

21. The method according to claim 20 wherein anion A$^-$ is selected from fluoride, chloride, bromide, iodide, hydroxide, acetate, and tetrafluoroborate.

22. The method according to claim 17 wherein the at least one active source of alumina is selected from Al(OH)$_3$, aluminum isopropoxide and pseudo-boehmite.

23. The method according to claim 17 wherein the at least one active source of phosphorus is phosphoric acid.

24. The method according to claim 17 wherein element "M" is selected from silicon, magnesium, manganese, zinc and cobalt.

25. The method according to claim 17 wherein the molecular sieve is AlPO-5, AlPO-31, AlPO-41, SAPO-5, SAPO-11, SAPO-41, MAPO-5, MAPO-11, MAPO-14, MAPO-34 or CoAPO-14.

26. The method according to claim 25 wherein the molecular sieve is AlPO-5, AlPO-31, AlPO-41, SAPO-5, SAPO-11, or SAPO-41.

27. A molecular sieve having a molar composition, as synthesized and in the anhydrous state, as follows:

$$aQ:(M_xAl_yP_z)O_2$$

wherein:

"Q" is an organosulfonium cation templating agent capable of forming said molecular sieve, wherein the organosulfonium cation has a molecular structure of the form S$^+$(R)$_3$, wherein each "R" is independently selected from alkyl, aryl and alkyaryl;

"a" has a value great enough to constitute an effective concentration of "Q" and is within the range of from greater than zero (0) to no greater than about 6;

"M" represents at least one element, other than aluminum and phosphorus, which is capable of forming an oxide in tetrahedral coordination with [AlO$_2$] and [PO$_2$] oxide structural units in the molecular sieve;

"x", "y", and "z" represent the mole fractions, respectively, of "M", aluminum, and phosphorus, wherein "x" has a value equal to or greater than zero (0), and "y" and "z" each have a value of at least 0.01.

28. The molecular sieve according to claim 27 wherein each "R" comprises less than 7 carbon atoms when "R" is alkyl and comprises in the range of from 5 to carbon atoms when "R" is otherwise.

29. The molecular sieve according to claim 28 wherein each "R" is independently selected from methyl, ethyl, n-propyl, isopropyl and phenyl.

30. The molecular sieve according to claim 28 wherein the organosulfonium cation templating agent is one or more of triethylsulfonium cation, methyldipropylsulfonium cation, methyldiisopropylsulfonium cation, diethylphenylsulfonium cation, ethyldiisopropylsulfonium cation, trimethylsulfonium cation, triphenylsulfonium cation, diphenylethylsulfonium cation.

31. The molecular sieve according to claim 27 wherein element "M" is selected from silicon, magnesium, manganese, zinc and cobalt.

32. The molecular sieve according to claim 27, which molecular sieve is AlPO-5, AlPO-31, AlPO-41, SAPO-5, SAPO-11, SAPO-41, MAPO-5, MAPO-11, MAPO-14, MAPO-34 or CoAPO-14.

33. The molecular sieve according to claim 27 wherein the molecular sieve is AlPO-5, AlPO-31, AlPO-41, SAPO-5, SAPO-11, or SAPO-41.

* * * * *